United States Patent [19]

Bunnell et al.

[11] 4,310,211
[45] Jan. 12, 1982

[54] HIGH CURRENT CONTACT SYSTEM FOR SOLAR MODULES

[75] Inventors: Edward D. Bunnell, Palm Harbor; Thomas J. Sotolongo, Clearwater Beach, both of Fla.

[73] Assignee: AMP Incorporated, Harrisburg, Pa.

[21] Appl. No.: 106,813

[22] Filed: Dec. 26, 1979

[51] Int. Cl.³ .................................. H01R 13/627
[52] U.S. Cl. ........................ 339/91 R; 339/94 R; 339/132 R; 339/211
[58] Field of Search ............ 136/244, 256; 339/91 R, 339/94 R, 94 C, 132 R, 176 R, 184 R, 186 R, 206 P, 211, 217 PS, 223 R

[56] References Cited

U.S. PATENT DOCUMENTS

| | | | |
|---|---|---|---|
| 3,057,951 | 10/1962 | Blakely | 174/8 |
| 3,181,105 | 4/1965 | Roach et al. | 339/184 R |
| 3,277,422 | 10/1966 | Shevlin | 339/211 |
| 3,409,858 | 11/1968 | Krehbiel | 339/91 R |
| 3,530,429 | 9/1970 | Scheller | 339/217 |
| 3,669,054 | 6/1972 | Desso et al. | 113/119 |
| 3,982,963 | 9/1976 | Mahoney et al. | 136/89 |
| 4,010,998 | 3/1977 | Tolnar, Jr. et al. | 339/91 R |
| 4,019,924 | 4/1977 | Kurth | 136/89 P |
| 4,150,866 | 4/1979 | Snyder, Jr. et al. | 339/94 M |
| 4,167,644 | 9/1979 | Kurth et al. | 136/89 EP |

*Primary Examiner*—John McQuade
*Attorney, Agent, or Firm*—Russell J. Egan

[57] ABSTRACT

A high current connector system is disclosed for use with photovoltaic modules of the type employed by the solar energy industry. The connector provides quick and positive means of connecting an array of solar cells in a module to a common bus and with a harness connector. The connector is configured to protect against inadvertent electrical shock during mating or unmating of the connector. The connector plug member has a two stage assembly which in the first stage allows for free passage for a conductor through the plug housing and in the second assembly stage provides an environmentally sealed condition for the plug with the seal also serving as a strain relief for the conductor.

9 Claims, 5 Drawing Figures

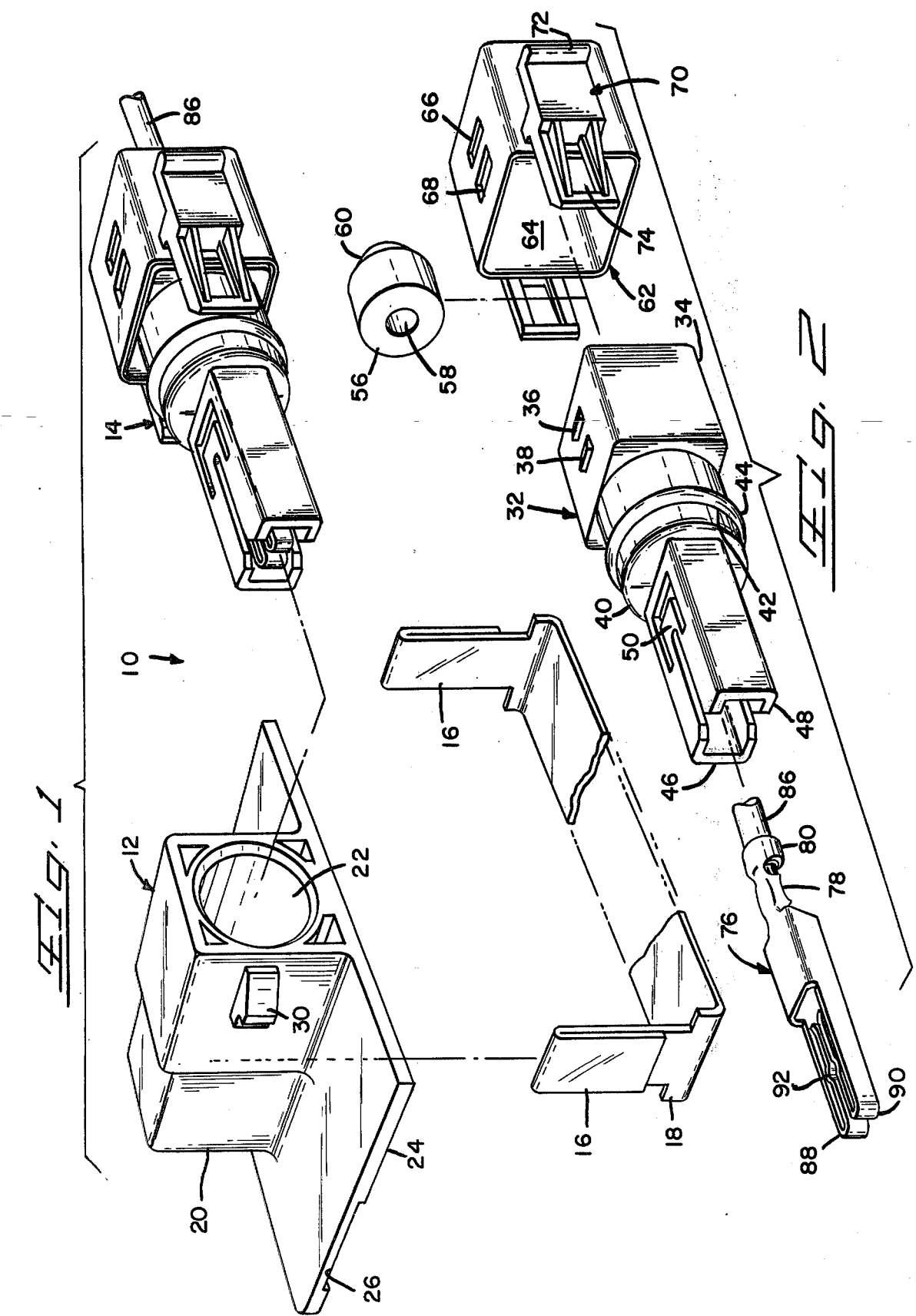

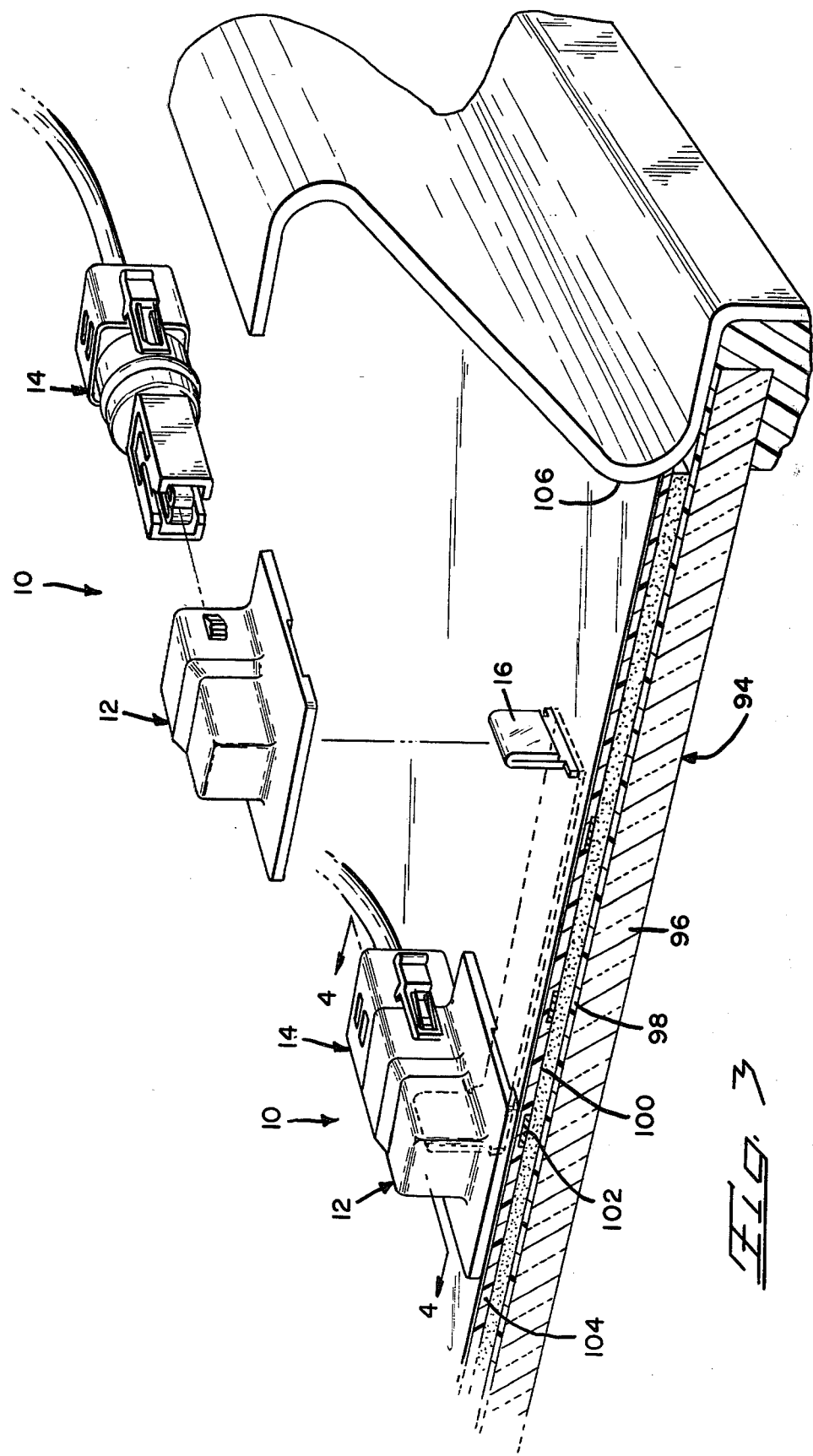

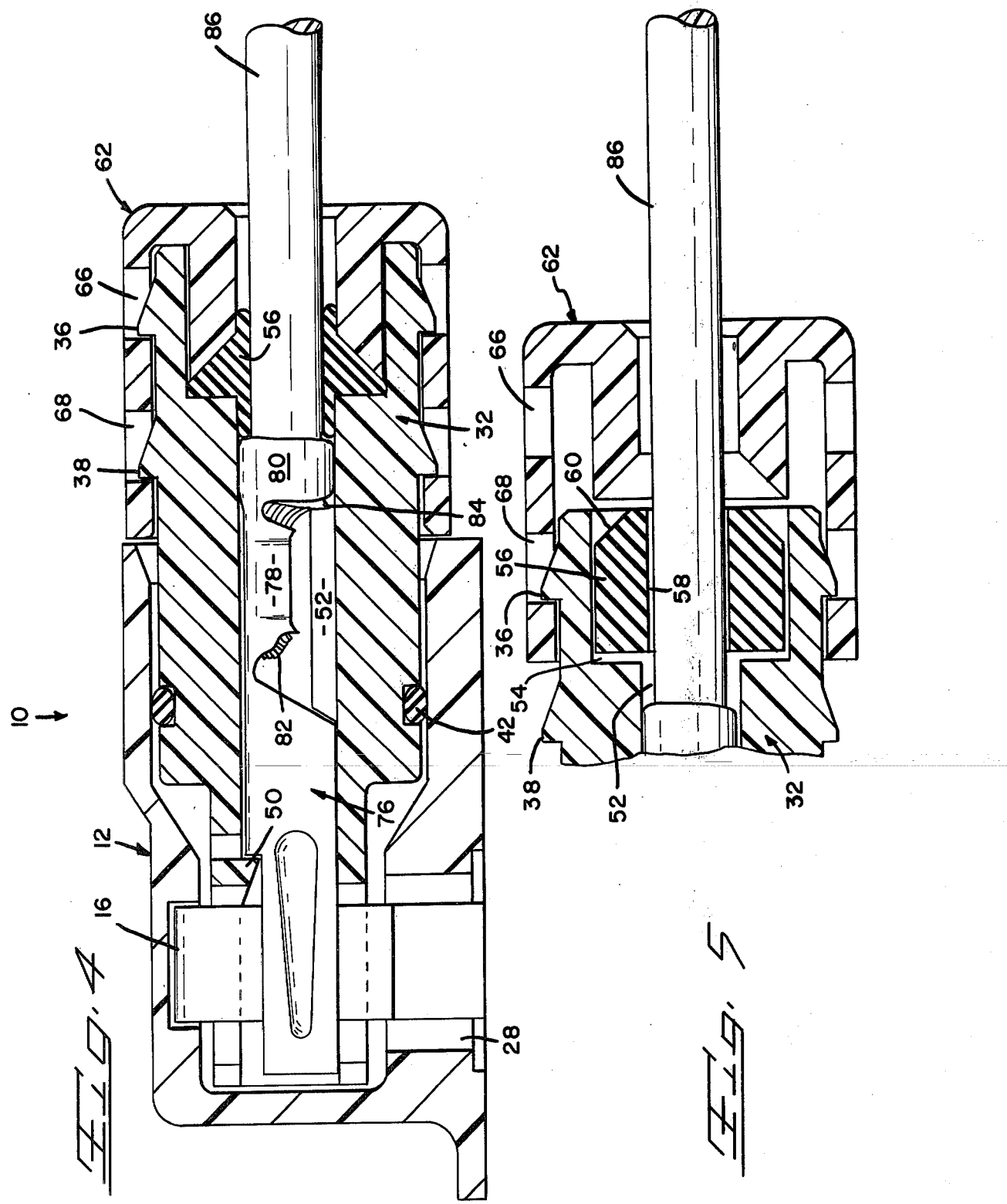

HIGH CURRENT CONTACT SYSTEM FOR SOLAR MODULES

BACKGROUND OF THE INVENTION

1. The Field Of The Invention

The present invention is intended for use in the solar panel industry and in particular concerns an electrical interconnect for photovoltaic panels.

2. The Prior Art

The newly emerging field of generating electrical power from solar radiation has created a need for electrical connectors of the type that have not heretofore been readily available. Amongst some of the requirements for the new connectors are they must be environmentally sealed as well as being capable of withstanding substantial amounts of heat. The connectors must also be of a type that will prevent accidental contact with the terminals during a mating or unmating of the connector, since high voltages are developed by solar panel arrays and they cannot be turned off for the mating or unmating operation.

SUMMARY OF THE INVENTION

The present invention is directed towards an improved electrical connector system for solar panels and includes a receptacle member having an elongated body mounted on a planar pad with the axis of the body extending parallel to the plane of the pad. The body contains a profiled bore adapted to receive a mating plug member therein. The receptacle member also includes a slot extending from the pad to the profiled bore. The receptacle further includes latching and polarizing means. The plug portion includes a profiled body having an axial bore passing therethrough. The exterior profile of the body includes an annular recess receiving an O-ring therein. At least two pairs of outwardly directed locking lugs are positioned on the plug body adjacent the rear end thereof. An annular sealing means is positioned on the rear of the axial bore. A cover member is received over the rear of the plug member and includes first and second apertures aligned to mate with the first and second locking lugs, respectively. The cover merely holds the sealing means in place when only one set of lugs and apertures are engaged and places the sealing means under compression when both sets are engaged. The cover also includes latching means adapted to engage the latching means of the receptacle. The terminals for the connector system includes a male terminal adapted to be received through the slot of receptacle to lie in the bore and to be secured to bus bars of a solar panel or the like and a mating female terminal adapted to be crimp connected to a conductor and held in the plug member by the sealing means.

It is therefore an object of the present invention to produce an improved solar panel connector which will be environmentally sealed.

It is a further object of the present invention to produce an improved connector for photovoltaic arrays which will prevent inadvertent contact with the terminals during mating and unmating of the connector.

It is a further object of the present invention to produce an improved connector for photovoltaic arrays which connector can be readily and economically produced.

The means for accomplishing the foregoing objects and other advantages of the present invention will become apparent to those skilled in the art from the following detailed discussion taken with reference to the accompanying drawings.

BRIEF DESCRIPTION OF THE DRAWINGS

FIG. 1 is an exploded perspective view of a connector system according to the present invention;

FIG. 2 is an exploded perspective view of the plug portion of the connector system of FIG. 1;

FIG. 3 is a perspective view of a photovoltaic array having one connector according to the present invention fastened thereto and a second connector according to the present invention exploded therefrom;

FIG. 4 is a longitudinal vertical section through the connector system according to the present invention in an assembled and mated condition; and FIG. 5 is a detailed section view, similar to FIG. 4, showing the plug member in a partially assembled condition.

DETAILED DESCRIPTION OF THE PREFERRED EMBODIMENT

The subject connector 10 includes a receptacle member 12 and a plug member 14. The receptacle member 12 is arranged to receive a tine portion 16 of a bus bar 18 therein. The receptacle member 12 has an elongated housing 20 with a profiled bore 22 therein. The housing is formed integrally with a pad 24 on one side thereof with the plane of the pad extending parallel to the axis of the bore 22. The bottom or mounting face of the pad 24 preferably has a mat finish, for purposes to be described hereafter, and includes a groove 26 extending transversely with respect to the axis of the bore 22. A slot 28 interconnects the groove 26 with the bore 22. The outside of the housing 20 is provided with at least one latching lug 30.

The plug member 14 includes a plug body 32 which has a rectangular base portion 34 on two opposite sides of which are first and second latching lugs 36, 38, an elongated cylindrical extension 40 leads forwardly of the base and has a peripherial recess 42 with an O-ring 44 therein. A pair of enclosure arms 46, 48 extend forward of the extension 40 and are joined on one side near their bases by locking lug 50. The plug member 14 also has a profiled axial bore 52 extending through the base 34, extension 40, and continuing between the arms 46, 48. The rear of the bore 52 is enlarged to form a cavity 54. An annular sealing member 56 having a bore 58 and a conically shaped end 60 is positioned in the cavity 54. A cap 62 has a cavity 64 profiled to receive the base 34 of the plug body 32. The cap 62 also includes first and second apertures 66, 68 on opposite sides thereof aligned to receive the lugs 36, 38, respectively. When lugs 36 engage in apertures 68, the plug member will be held in an assembled condition, as shown in FIG. 4, and the wire 86 can be moved freely through sealing member 56. When lugs 36, 38 engage in apertures 66, 68 respectively, as shown in FIG. 4, the sealing means 56 will be compressed to tightly engage wire 86. There is also at least one integral latching member 70 including an actuating arm 72 and a profiled aperture 74 adapted to accommodate the lug 30 of the receptacle member 12. The latching lug 30 and latching member 70 can also serve a polarizing function.

A terminal 76 for the plug member 14 has a crimp barrel 78 and strain relief ears 80, of known type, for engaging a conductor 82 and insulation 84 of a wire 86.

The terminal also includes a pair of arms 88, 90 which are folded upon themselves to define a blade receiving slot 92 therebetween.

A typical installation is shown in FIG. 3 with a photovoltaic panel 94 comprising a glass pane 96 supporting a conductive web 98 having a plurality of cells schematically indicated by 100 thereon. The cells are interconnected by bus bars 102 and a covering web of insulation 104 is placed thereover. The entire assembly is held within a frame 106. A typical panel of this type is shown in U.S. Pat. No. 4,042,418, the disclosure of which is incorporated herein by reference. Prior to the installation of the coating 104, the busses 18 are soldered appropriately to the busses 102. These are arranged for either series or parallel interconnection of the individual cells.

Conventionally the bus 18 would be soldered to the busses 102, the layer 104 applied and the blades 16 bent down parallel to the plane of the panel so that it can be entirely horizontally treated by passage through heated webs, rollers, or the like. The blades are then bent up normal to the panel and the receptacle applied thereto. The blade would pass through the slot 28 of the receptacle and the receptacle would be adhered by the previously mentioned mat finish surface 24. The mat finish aids in the gripping of mastic or adhesive material to the pad. The groove 26 accommodates any bulge which may be produced by the bus 18. It is then a simple matter to interconnect the photovoltaic panels by application of the plugs to affect a series or parallel interconnection between the various panels.

The present invention may be subject to many modifications and changes without departing from the spirit or essential characteristics thereof. The present embodiment should therefore be considered in all respects as illustrative and not restrictive as to the scope of the invention.

What is claimed is:

1. An improved electrical connector for photovoltaic solar panels and the like, said connector comprising:
    a receptacle member having an elongated body and an integral planar pad with the longitudinal axis of the body extending parallel to the plane of the pad, a profiled bore in said body and a slot extending between said pad and said bore;
    a first terminal having a base portion adapted to be secured to a bus bar of a solar panel and a blade adapted to extend through said slot to lie, at least in part, in said bore of said receptacle member;
    a plug member having a profiled body adapted to be received within said bore of said receptacle member, a profiled axial bore in said plug member having an enlarged, rearwardly directed cavity, a pair of spaced terminal enclosing arms extending forwardly of said profiled body and defining an extension of said axial bore, profiled annular sealing means mounted in said cavity and a cover member adapted to receive a rear portion of said plug member therein, means to secure said cover member on said plug member, means on said cover member to apply force to said sealing means to cause it to assume a sealing profile; and
    a second terminal adapted to be mounted in said axial bore of said plug member, to mate with said first terminal and to terminate a conductor.

2. An electrical connector according to claim 1 further comprising:
    means to latchingly engage said plug member in said receptacle member.

3. An electrical connector according to claim 1 further comprising:
    polarizing means controlling mating of said plug member into said receptacle member.

4. An electrical connector according to claim 1 further comprising:
    an annular groove in the outer surface of said plug member, and
    an O-ring mounted in said groove whereby said plug member sealingly mates with said receptacle member.

5. An electrical connector according to claim 1 wherein said means to secure said cover member on said plug member comprises:
    at least two spaced lugs on each of two opposite sides of one of said cover member and said plug member; and
    a like number of apertures on two opposite sides of the other of said cover member and said plug member whereby said cover member can be held on said plug member in a first position with only one lug on each side engaging a respective aperture or a second position with all lugs engaging in respective apertures.

6. An electrical connector according to claim 1 wherein said second terminal comprises:
    a body of conductive material having a conductor engaging crimp barrel and a pair of arms defining a blade engaging slot therebetween.

7. An electrical connector according to claim 6 wherein said crimp barrel comprises:
    a conductor engaging crimp portion; and
    an insulation engaging strain relief portion.

8. An electrical connector according to claim 6 wherein said pair of arms comprise:
    a pair of parallel, spaced, cantilever arms each folded upon itself.

9. An electrical connector according to claim 1 further comprising:
    lug means on said plug member adapted to latch said second terminal therein.

* * * * *